(12) United States Patent
Boersma et al.

(10) Patent No.: US 9,164,725 B2
(45) Date of Patent: Oct. 20, 2015

(54) APPARATUS AND METHOD FOR CALCULATING AN SHA-2 HASH FUNCTION IN A GENERAL PURPOSE PROCESSOR

(75) Inventors: Maarten J. Boersma, Holzgerlingen (DE); Markus Kaltenbach, Leinfelden (DE); Jens Leenstra, Bondorf (DE); Tim Niggemeier, Laatzen (DE); Philipp Oehler, Gaertringen (DE); Philipp Panitz, Schoenaich (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 308 days.

(21) Appl. No.: 13/181,678

(22) Filed: Jul. 13, 2011

(65) Prior Publication Data

US 2012/0128149 A1 May 24, 2012

(30) Foreign Application Priority Data

Nov. 19, 2010 (EP) ..................................... 10191825

(51) Int. Cl.
*G06F 7/00* (2006.01)
*H04L 9/32* (2006.01)

(52) U.S. Cl.
CPC ................ *G06F 7/00* (2013.01); *H04L 9/3239* (2013.01); *H04L 2209/125* (2013.01)

(58) Field of Classification Search
None
See application file for complete search history.

(56) References Cited

U.S. PATENT DOCUMENTS

| | | | |
|---|---|---|---|
| 7,599,489 B1 | 10/2009 | Spracklen | |
| 2007/0226444 A1* | 9/2007 | Yagawa | 711/170 |
| 2008/0037544 A1* | 2/2008 | Yano et al. | 370/392 |
| 2009/0022307 A1* | 1/2009 | Torla | 380/28 |
| 2009/0028326 A1 | 1/2009 | Qi et al. | |
| 2009/0070607 A1* | 3/2009 | Safford et al. | 713/320 |
| 2009/0141887 A1 | 6/2009 | Yap et al. | |
| 2010/0086127 A1* | 4/2010 | Grinchuk et al. | 380/29 |
| 2011/0176673 A1* | 7/2011 | Yamamoto et al. | 380/28 |

OTHER PUBLICATIONS

Juliato, Marcio et al., "Tailoring a Reconfigurable Platform to SHA-256 and HMAC through Custom Instructions and Peripherals", Reconfigurable Computing and FPGAs, 2009, Dec. 9, 2009, pp. 195-200.*

Trouve, Antoine, et al. "Accelerating Cryptographic Applications Using Dynamically Reconfigurable Functional Units," Department of Informatics, 2009, Kyushu University, Japan (6 pages).

(Continued)

*Primary Examiner* — David Le
(74) *Attorney, Agent, or Firm* — James L. Baudino

(57) ABSTRACT

Various systems, apparatuses, processes, and/or products may be used to calculate an SHA-2 hash function in a general-purpose processor. In some implementations, a system, apparatus, process, and/or product may include the ability to calculate at least one SHA-2 sigma function by using an execution unit adapted for performing a processor instruction, the execution unit including an integrated circuit primarily designed for calculating the SHA-2 sigma function(s), and calculating the SHA-2 hash function with general-purpose hardware processing components of the processor based on the sigma function(s). In certain implementations, the calculation of the SHA-2 sigma function(s) can be performed by the integrated circuit within a single instruction, allowing for a faster calculation of the SHA-2 hash function.

20 Claims, 4 Drawing Sheets

(56) References Cited

OTHER PUBLICATIONS

Yu, Pan, "Design Methodologies for Instruction-Set Extensible Processors," Doctoral Thesis in Department of Computer Science, 2008, National University of Singapore (162 pages).

Yu, Jason, et al., "Vector Processing as a Soft-core CPU Accelerator," FPGA '08, Monterey, CA, Feb. 24-26 2008, Association for Computing Machinery (10 pages).

Information Technology Laboratory, "Federal Information Processing Standards Publication 180-3: Secure Hash Standard," Oct. 2008, National Institute of Standards and Technology, Gaithersburg, MD (32 pages).

Dadda, Luigi, et al., "The Design of a High Speed ASIC Unit for the Hash Function SHA-256 (384, 512)", Design, Automation and Test in Europe Conference and Exhibition, Feb. 2004 (6 pages).

Juliato, M. et al.; Tailoring a Reconfigurable Platform to SHA-256 and HMAC through Custom Instructions and Peripherals; 2009 International Conference on Reconfigurable Computing and FPGAs; Dec. 9, 2009; pp. 195-200.

International Search Report and Written Opinion; International Application No. PCT/EP2011/070225; Jun. 27, 2012.

\* cited by examiner

APPARATUS AND METHOD FOR CALCULATING AN SHA-2 HASH FUNCTION IN A GENERAL PURPOSE PROCESSOR

BACKGROUND

The present invention relates to a general purpose processor that includes an execution unit adapted for performing a processor instruction, whereby the execution unit comprises an integrated circuit.

A fast calculation of checksums that are secure is important in the presence of cloud computing and RAS (Remote Access Service). A checksum received together with a message allows for verifying that the message was not changed during transmission. The secure hash standard (SHS) provides a set of cryptographically secure hash algorithms (SHA) specified by the National Institute of Standards and Technology. Defined in Federal Information Processing Standards (FIPS) Publication 180-3, SHA-2 is such a standard that is as of today known to be secure and therefore frequently used for calculating checksums. Usually, encryption and/or decryption are performed together with checksum calculation. Thus, efficient checksum calculation methods prevent the encryption and/or decryption from being a bottleneck in simultaneous calculations.

Several approaches for hardware accelerated SHA are known from prior art. All of them have in common that the whole algorithm is implemented in a special hardware that makes such implementations difficult and costly (see, for example, "The Design of a High Speed ASIC Unit for the Hash Function SHA-256" (384, 512)", Dada et al., DATE'04).

Since the SHA algorithm works on 8 internal 32-bit states or on 8 internal 64-bit states, it is quite difficult, if not impossible, to build fully pipelined hardware that performs the whole algorithm. But most in-core execution units are fully pipelined in order to have a higher throughput. If hashing is performed off-core, data chunks must be large enough to compensate for transfer cycles required to send the data to an off-core accelerator and to send a result back. Additionally, the hardware cannot be used by multiple threads simultaneously if it is not pipelined.

SUMMARY

In one general implementation, a process for calculating an SHA-2 hash function by a processor may include calculating at least one SHA-2 sigma function by using an execution unit adapted for performing a processor instruction, the execution unit including an integrated circuit primarily designed for calculating the SHA-2 sigma function, and calculating the SHA-2 hash function with general-purpose hardware processing components of the processor based on the sigma function.

BRIEF DESCRIPTION OF THE SEVERAL VIEWS OF THE DRAWINGS

Various embodiments are illustrated in the accompanying figures. These embodiments are merely exemplary, i.e. they are not intended to limit the content and scope of the appended claims.

DETAILED DESCRIPTION

A hash function can be accelerated in a processor by providing specialized hardware for computing one or more components of the hash function. For example, one or more sigma functions for the SHA-2 hash function may be calculated by an execution unit that includes an integrated circuit defined for calculating sigma functions, resulting in a speed-up of the execution time for calculating the overall hash function. In certain implementations, all of the sigma functions for a hash function may be performed in a single cycle, resulting in a further speed-up of the execution time for calculating the overall hash function.

Figure 1:
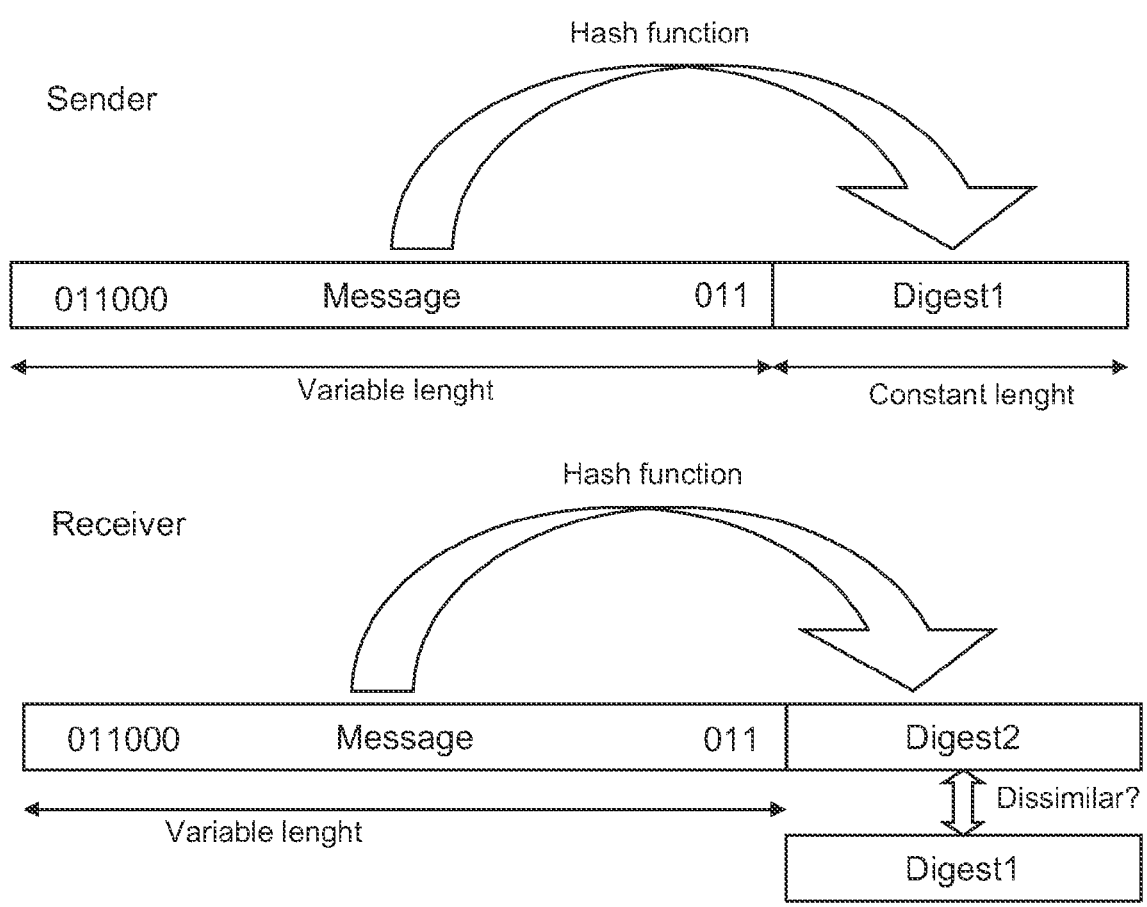
FIG. 1 shows a hashing principle according to prior art.

Referring now to FIG. 1, a hashing principle according to prior art is shown. Hashing is used for various information security applications, notably in digital signatures, for message authentication codes (MACs), and other forms of authentication. Among various other hashing principles known from prior art, SHA-2 as defined in FIPS 180-3 is often used as SHA-2 and is known to be secure.

As can be seen in FIG. 1, a digest1 of a message of a variable length is calculated by a sender of the message by using a hashing function, whereby digest1 comprises a constant length. A receiver then calculates a digest2 of the received message by using the hashing function and compares digest2, which has the same constant length as digest1, with digest1. A dissimilarity of the comparison indicates that the received message comprises an error (i.e., that the received message is dissimilar to the message sent by the sender) and, for example, should be resent.

Figure 2:
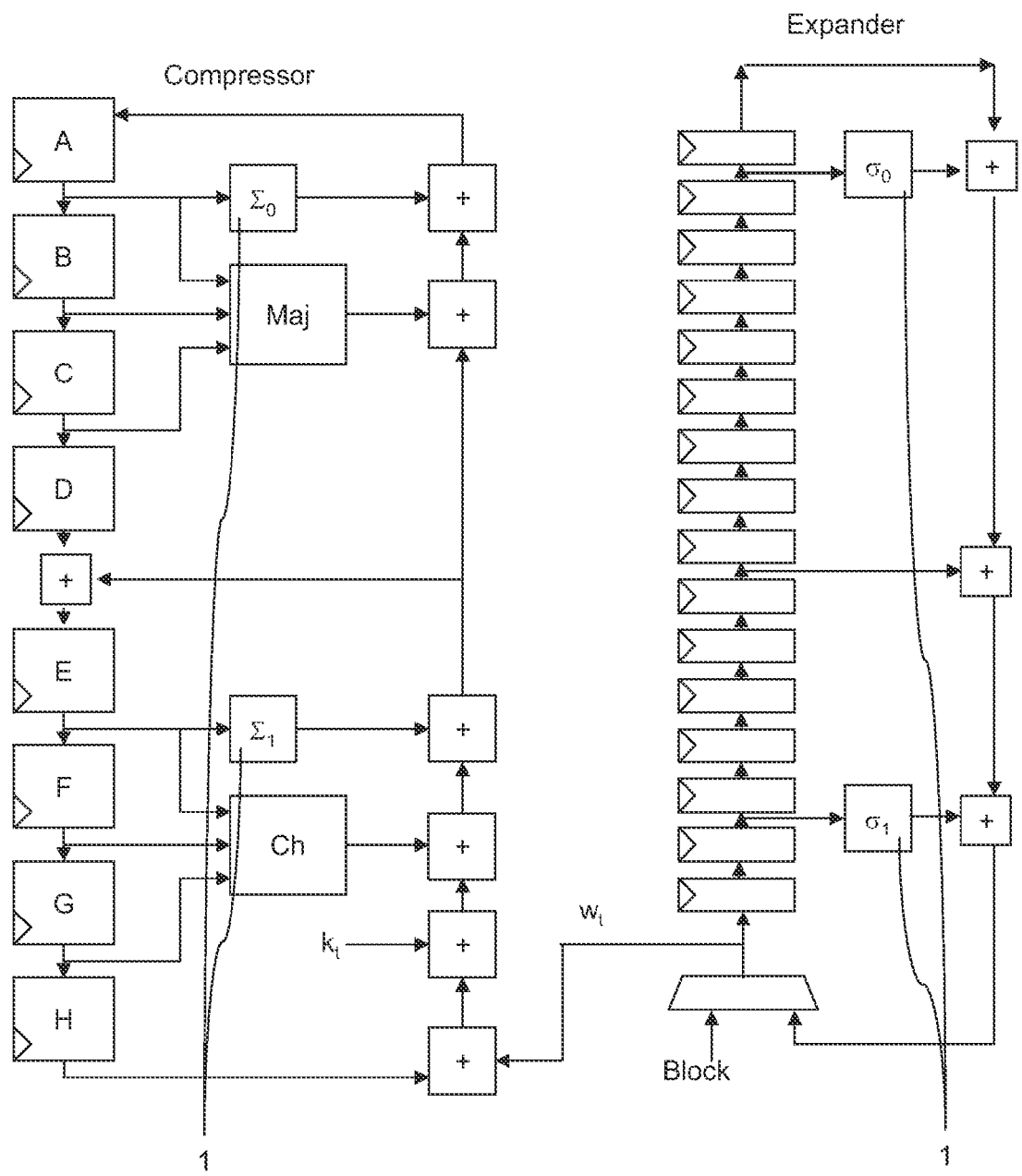
FIG. 2 shows an SHA-2 hash function that includes four functions—$\Sigma_0$, $\Sigma_1$, $\sigma_0$ and $\sigma_1$—according to prior art.

FIG. 2 shows an SHA-2 hash function for performing the hash function as shown in FIG. 1. The SHA-2 hash function is defined in the FIPS 180-3 standard and includes, among other complex functions for transforming internal states A, B, . . . , E to next states A', B', . . . , E', four sigma functions $1-\Sigma_0$, $\Sigma_1$, $\sigma_0$, and $\sigma_1$. Most of these complex functions can be calculated by applying instructions that are part of an instruction set of a general purpose CPU (i.e., a processor).

In FIPS 180-3, the sigma functions 1 are defined as:

$\Sigma_0^{\{256\}}(x) = ROTR^2(x) \oplus ROTR^{13}(x) \oplus ROTR^{22}(x)$ $\Sigma_1^{\{256\}}(x) = ROTR^6(x) \oplus ROTR^{11}(x) \oplus ROTR^{25}(x)$ $\sigma_0^{\{256\}}(x) = ROTR^7(x) \oplus ROTR^{18}(x) \oplus SHR^3(x)$ $\sigma_1^{\{256\}}(x) = ROTR^{17}(x) \oplus ROTR^{19}(x) \oplus SHR^{10}(x)$ for a 32-bit dataflow; and as $\Sigma_0^{\{512\}}(x) = ROTR^{28}(x) \oplus ROTR^{34}(x) \oplus ROTR^{39}(x)$ $\Sigma_1^{\{512\}}(x) = ROTR^{14}(x) \oplus ROTR^{18}(x) \oplus ROTR^{41}(x)$ $\sigma_0^{\{512\}}(x) = ROTR^1(x) \oplus ROTR^8(x) \oplus SHR^7(x)$ $\sigma_1^{\{512\}}(x) = ROTR^{19}(x) \oplus ROTR^{61}(x) \oplus SHR^6(x)$ for a 64-bit dataflow.

ROTR", also known as RRn, is a rotate right operation (i.e., a circular right shift operation), and SHR", also known as SRn, is a right shift operation, whereby n is an integer with 0≤n≤the number of bits in the dataflow. More details can be derived by the man skilled in the art from the FIPS 180-3 standard.

Figure 5:
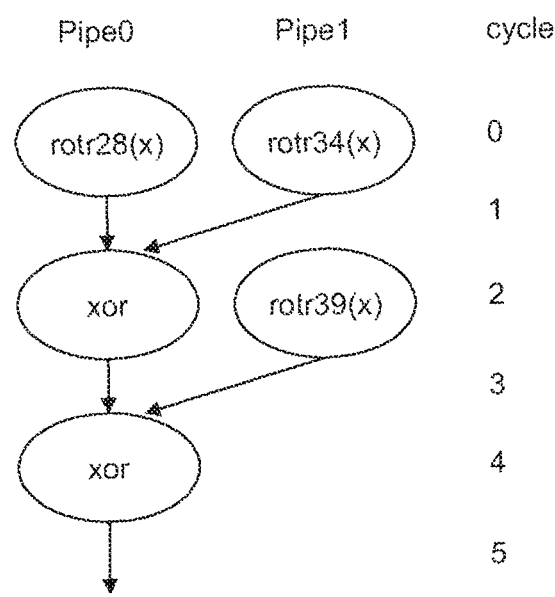
FIG. 5 shows a cycle for calculating the $\Sigma_0$ sigma function for a 64-bit dataflow according to prior art.

The sigma functions 1 are therefore the exclusive-or operation of three different rotates and/or shifts of a certain state and, hence, can be emulated using 5 instruction cycles, as shown in FIG. 5 exemplary for $\Sigma_0$ for a 64-bit flow.

Particular implementations provide a general purpose processor including an execution unit adapted for performing a processor instruction, whereby the execution unit includes an integrated circuit that is designed primarily for calculating an SHA-2 sigma function. Thus, an in-core accelerator instruction in the execution unit of a processor is provided that calculates a sigma function, such as $\Sigma_0$, $\Sigma_1$, $\sigma_0$ and/or $\sigma_1$ of an SHA-2 hash function (e.g., of the SHA-2 standard as defined in FIPS 180-3). As such, the calculation may be performed in a single instruction by the integrated circuit. This process allows for an improved (e.g., a faster) calculation of the SHA-2 sigma function respectively of the SHA-2 function compared to the prior art and requires less costly hardware, as less space is required. In other words, opposite to prior art, the SHA-2 hash calculation is performed in a processor by using a processor instruction, whereby a sigma function, and preferably all of the sigma functions, of the SHA-2 hash calculation are performed in the integrated circuit that is primarily, possibly exclusively, designed for calculating sigma functions.

According to FIPS 180-3, the sigma function is a result of an exclusive-or operation of three different rotates of a certain state. Thus, the calculation of a sigma function can be emulated using five processor instructions, as shown in FIG. 5. Reducing the calculation a single instruction therefore may result in significant gains (e.g., a factor of 3 in performance gain and a factor of 5 in an issue slot gain). The gains result from a finding that the efficiency of such an in-core accelerator as provided by the execution unit respectively by the integrated circuit does not depend of the amount of data processed.

The general purpose processor and/or the execution unit can be provided as any processor and/or execution unit known from prior art that are capable of executing a processor instruction and may include electrical components such as, for example, registers, other internal units such as a sub-ALU or FPU, or some smaller, more specific components. In similar manner, the integrated circuit may include passive and/or active electrical components known from prior art that are capable of calculating a SHA-2 sigma function. The word "primarily" means for the present disclosure that the integrated circuit is designed for, preferably exclusively, calculating SHA-2 sigma functions. This means that the integrated circuit preferably cannot perform any other operation, such as any other mathematical operation, than performing an SHA-2 sigma calculation. For performing those other operations (e.g., processor instructions other than calculating an SHA-2 sigma function), the execution unit may comprise further calculation means known from prior art.

In particular embodiments, the execution unit and/or the integrated circuit may have a 128-bit data width or a 256-bit data width. In certain embodiments, the execution unit and/or the integrated circuit may be capable of handling a 32-bit dataflow and/or a 64-bit dataflow, whereby the 32-bit dataflow is related to an SI-IA-2 hash function with a digest size of 224 and/or 256, also referred to as SHA-224 and SHA-256, respectively, and the 64-bit data flow is related to an SHA-2 hash function with a digest size of 384 and/or 512, also referred to as SHA-384 and/or SHA-512, respectively.

In some embodiments, the execution unit may be provided as a scalar unit and/or as a vector unit, which are known from prior art in different variations. In the following, a scalar unit implies a unit capable of executing instructions defining a single operand set that is typically operating on a pair of source values and generating a destination value for each instruction. A vector unit operates in parallel on a plurality of value pairs to generate a plurality of results. These are often provided in the form of packed operands; that is, two packed operands provide a plurality of value pairs, one from each operand in respective lanes.

In certain embodiments, the execution unit supports a 32-bit dataflow and/or a 64-bit dataflow and calculating the sigma function includes, in case of a 32-bit dataflow:

a) calculating results of each RR2, RR13 and RR22, and/or
b) calculating results of each RR6, RR1 and RR25, and/or
c) calculating results of each RR7, RR18 and SR3, and/or
d) calculating results of each RR17, RR19 and SR10, and for each a), b), c), and/or d), combining the respective results via an exclusive-or operation for obtaining the sigma function—$\Sigma_0$, $\Sigma_1$, $\sigma_0$ or $\sigma_1$—respectively; and/or in case of a 64-bit dataflow:

e) calculating results of each RR28, RR34 and RR39, and/or
f) calculating results of each RR14, RR18 and RR41, and/or
g) calculating results of each RR1, RR8 and SR7, and/or
h) calculating results of each RR19, RR61 and SR6, and for each e), f), g), and/or h), combining the respective results via an exclusive-or operation for obtaining the sigma function—$\Sigma_0$, $\Sigma_1$, $\sigma_0$ or $\propto_1$—respectively.

Particular embodiments are preferably compliant to the definitions made in the FIPS 180-3 standard. Thus, for example, RRn may equal ROTR" (i.e., equals a rotate right operation), and SRn may equal SHR" (i.e., equals a right shift operation), whereby n is an integer with 0≤n≤the number of bits in the dataflow, for example 32 or 64. In this way, the solution provides an advantageous process for calculating sigma functions $\Sigma_0$, $\Sigma_1$, $\sigma_0$, and/or $\sigma_1$ by the execution unit respectively by the integrated circuit.

Generally, any combination of sigma functions can be calculated by the execution unit and/or by the integrated circuit in parallel. However, according to certain embodiments, the execution unit includes a vector dataflow supporting the calculating of the SHA-2 sigma function. In particular implements, the execution unit and/or the integrated circuit may be designed for calculating at least four sigma functions in parallel in case of a 32-bit dataflow and for calculating at least two sigma functions in parallel in case of a 64-bit dataflow. With a data width of 128 bits for the integrated circuit, for example, four sigma functions can be calculated in parallel in case of a 32-bit dataflow, or two sigma functions can be calculated in parallel in case of a 64-bit dataflow. In certain embodiments, the sigma functions $\Sigma_0$, $\Sigma_1$, $\sigma_0$ and $\sigma_1$ are calculated in parallel in case of the 32-bit dataflow, and the sigma functions $\Sigma_0$ and $\sigma_0$ or the sigma functions $\Sigma_1$ and $\sigma_1$ are calculated in parallel in case of the 64-bit dataflow. Calculating all the sigma functions $\Sigma_0$, $\Sigma_1$, $\sigma_0$ and $\sigma_1$ in parallel speeds up the calculation of an SHA-2 has function as all sigma functions are calculated in only one instruction by the execution unit respectively by the integrated circuit.

In particular embodiments, the processor is adapted for calculating an SHA-2 hash function by using the integrated circuit for calculating the SHA-2 sigma function. The other functions for calculating the SHA-2 hash function may be readily derived from the hash function, such as, for example, the Maj or Ch functions in the case of FIPS 180-3.

In particular implementations, the SHA-2 hash function is calculated by using the SHA-2 function as defined in FIPS 180-3. The execution time for calculating the SHA-2 has function can be further decreased by calculating the SHA-2 function in the processor core, for example in a higher simultaneous multi-threading mode, while using the execution unit for calculating the sigma function.

In certain embodiments, the execution unit is configured for calculating the SHA-2 sigma function within a single processor instruction cycle. In particular implementations, the processor instruction is provided as an in-core processor instruction, thus allowing the sigma function to be calculated within a single cycle processor instruction by the execution unit. In relation thereto, the processor may include an out-of-order processor core, and the execution unit may be arranged in the out-of-order processor core. Equally, such out-of-order processor core can be provided as any out-of-order processor core known from prior art that is suitable for calculating a sigma function.

Particular implementations include a process for calculating an SHA-2 sigma function by a processor that includes an execution unit adapted for performing a processor instruction, the execution unit including an integrated circuit primarily designed for calculating the SHA-2 sigma function. The process may, for example, include, calculating the SHA-2 sigma function by the integrated circuit.

Thus, an in-core accelerator instruction in the execution unit of a processor is provided that calculates a sigma function, such as $\Sigma_0$, $\Sigma_1$, $\sigma_0$, and/or $\sigma_1$ of an SHA-2 hash function. As such calculation is performed preferably within a single instruction by the integrated circuit, the execution unit allows for a faster calculation of the SHA-2 sigma function respectively of the SHA-2 function compared to prior art.

The execution unit may be provided as a scalar unit and/or as a vector unit. In particular embodiments, the execution unit supports a 32-bit dataflow and/or a 64-bit dataflow and calculating the sigma function comprises in case of the 32-bit dataflow:
  a) calculating results of each RR2, RR13 and RR22, and/or
  b) calculating results of each RR6, RR1 and RR25, and/or
  c) calculating results of each RR7, RR18 and SR3, and/or
  d) calculating results of each RR17, RR19 and SR10, and for each a), b), c) and/or d) combining the respective results via an exclusive-or operation for obtaining sigma function $\Sigma_0$, $\Sigma_1$, $\sigma_0$ or $\sigma_1$, respectively, and/or in case of the 64-bit dataflow:
  e) calculating results of each RR28, RR34 and RR39, and/or
  f) calculating results of each RR14, RR18 and RR41, and/or
  g) calculating results of each RR1, RR8 and SR7, and/or
  h) calculating results of each RR19, RR61 and SR6, and for each e), f), g) and/or h) combining the respective results via an exclusive-or operation for obtaining sigma function $\Sigma_0$, $\Sigma_1$, $\sigma_0$ or $\sigma_1$, respectively.

In certain embodiments, the process includes calculating at least four sigma functions in parallel in case of the 32-bit dataflow by the integrated circuit and calculating at least two sigma functions in parallel in case of the 64 dataflow by the integrated circuit. In particular embodiments, the sigma functions $\Sigma 0$, $\Sigma 1$, $\sigma 0$ and $\sigma 1$ are calculated in parallel in case of a 32-bit dataflow and the sigma functions $\Sigma 0$ and $\sigma 0$ or the sigma functions $\Sigma 1$ and $\sigma 1$ are calculated in parallel in case of a 64-bit dataflow.

Certain implementations include a process for calculating an SHA-2 hash function by a processor that includes an execution unit adapted for performing a processor instruction. The process may include: 1) calculating the SHA-2 sigma function as herein described; and 2) calculating the SHA-2 hash function by the execution unit.

Certain embodiments may provide a computer program product for calculating an SHA-2 function. The computer program product may include a computer readable storage medium having computer readable program code embodied therewith, and the computer readable program code may include computer readable program code configured to execute a hash calculation process. Preferably the computer readable program code includes processor instructions for the processor and/or for the execution unit.

Further embodiments and advantages of the process and/or of the computer program product can be derived by the man skilled in art in analogy to the processor as outlined before.

As will be appreciated by one skilled in the art, aspects of the disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device:

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Various aspects are described below with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
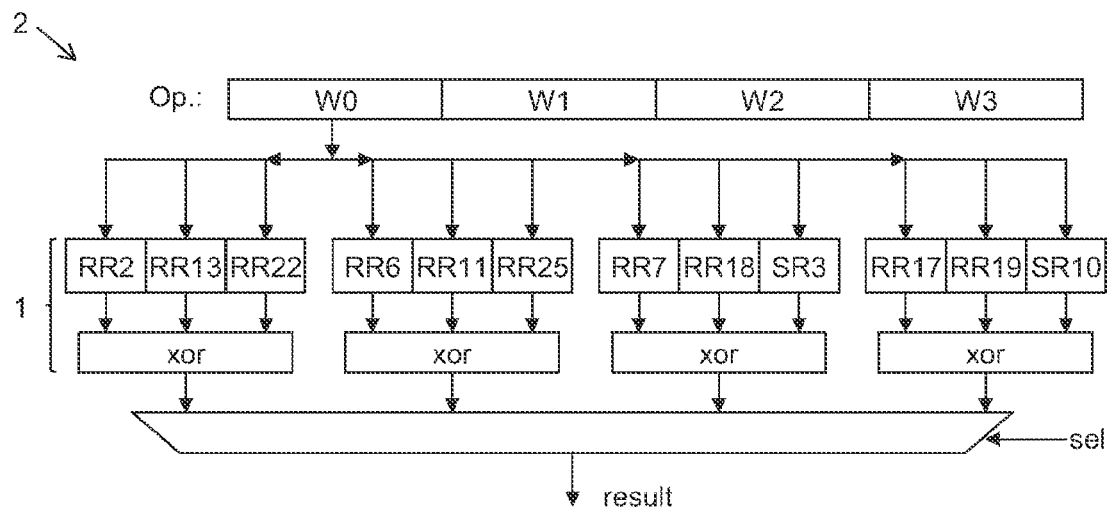
FIG. 3 shows an exemplary execution unit for calculating the SHA-2 sigma functions for a 32-bit dataflow in a schematic view.
Figure 4:
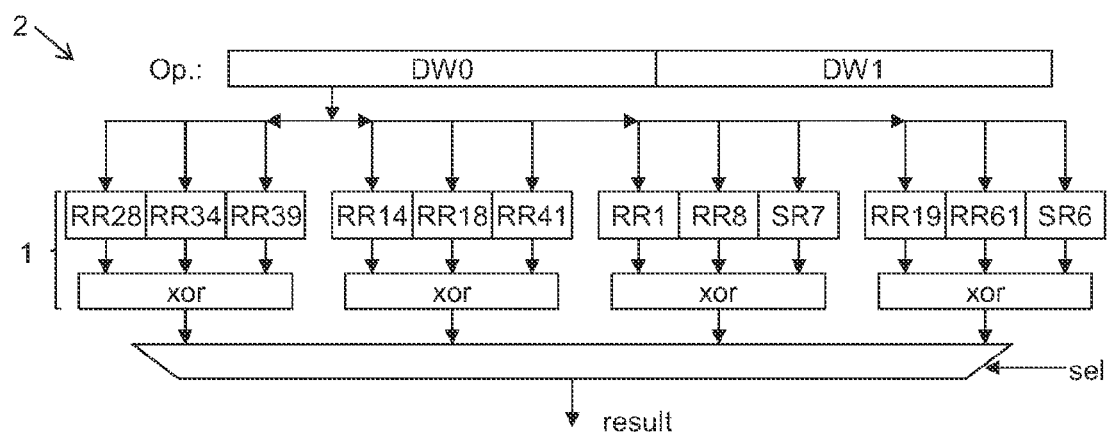
FIG. 4 shows another exemplary execution unit for calculating the SHA-2 sigma functions for a 64-bit dataflow in a schematic view.

FIG. 3 and FIG. 4 show an exemplary execution unit 2 for calculating the SHA-2 sigma functions for a 32-bit dataflow and for a 64-bit dataflow, respectively, in a schematic view. Thus, FIG. 3 and FIG. 4 illustrate an execution unit 2 for calculating the sigma functions 1 in the hardware of a processor (i.e., in an integrated circuit that is provided in the execution unit 2 and is designed primarily for calculating sigma functions 1).

This means that the integrated circuit includes hardware components that can primarily calculate sigma functions 1 for SHA-2, while the execution unit includes further hardware components such as registers, other internal units such as a sub-ALU or FPU, or some smaller, more specific components, for calculating and/or performing other processor instructions beside calculating sigma functions 1 as known from prior art. The sigma functions 1 of the SHA-2 function can furthermore be provided as an in-core accelerator instruction of the processor, while the execution of the sigma functions 1 according to the disclosure can be executed in an out-of-order processor core as a single processor instruction.

The SHA-2 function can be calculated in the processor core, for example in a higher simultaneous multi-threading mode, while using the execution unit 2 for calculating the sigma functions 1, for further decreasing execution time. The other functions required for calculating the SHA-2 function, beside the sigma functions, such as, for example, Maj and Ch, may be calculated by the processor using processor instructions.

When the execution unit 2 uses a 128-bit data width, in a first implementation according to FIG. 3, four sigma functions 1 can be calculated in parallel in case of the 32-bit dataflow, and in a second implementation according to FIG. 4, two sigma functions 1 can be calculated in parallel in case of the 64-bit dataflow, whereby the sigma functions 1 can be calculated in every possible combination. For example, it is possible in case of the 32-bit dataflow, to calculate all different sigma functions $1 - \Sigma_0, \Sigma_1, \sigma_0$ and $\sigma_1$—in parallel or to calculate four times $\Sigma_0$ in parallel. The 32-bit dataflows are referred to as W0, W1, W2 and W3, and the 64-bit dataflows are referred to as DW0 and DW1.

It can be seen that, for example in FIG. 3, sigma function 1 $\Sigma_0$ is calculated for a 32-bit dataflow in the execution unit 2 by calculating the results of the three different rotates of RR2, RR13 and RR22 and followed by combining the respective results via an exclusive-or operation. The result of sigma function 1 $\Sigma_0$ is then obtained via a multiplexer referred to as sel.

Figure 6:
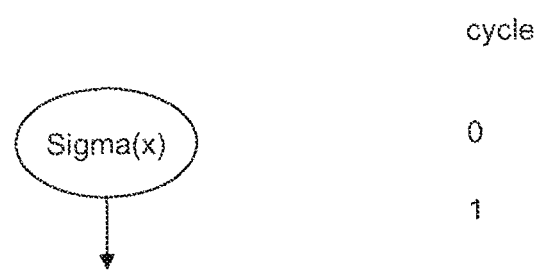
FIG. 6 shows a cycle for calculating the $\Sigma_0$ sigma function for the 64-bit dataflow according to an exemplary implementation.

As shown in FIG. 6, one or more sigma functions 1 may be performed in a single instruction cycle by an execution unit 2 that is provided in the exemplary implementation as a vector unit that includes an integrated circuit primarily defined for calculating sigma functions 1, as shown in FIG. 3 and FIG. 4, resulting in a speed-up of the execution time for calculating the overall SHA-2 function. For example, when compared to FIG. 3, a performance gain of factor 3 and an issue slot gain of factor 5 may be achieved. Thus, the execution units can calculate an SHA-2 hash function in an improved and less costly manner.

For implementing the sigma functions 1 in the processor hardware (i.e., in the execution unit), the sigma functions 1 for a 32-bit dataflow can be implemented as:

```
do i = 0 to 3
    src ← VR[VA].word[i]
    if ST=0 & SIX.bit[i]=0 then // SHA-256 σ0 function
        VR[VT].word[i] ← (src >>> 7) ^ (src >>> 18) ^ (src >> 3)
    if ST=0 & SIX.bit[i]=1 then // SHA-256 σ1 function
        VR[VT].word[i] ← (src >>> 17) ^ (src >>> 19) ^ (src >> 10)
    if ST=1 & SIX.bit[i]=0 then // SHA-256 Σ0 function
        VR[VT].word[i] ← (src >>> 2) ^ (src >>> 13) ^ (src >>> 22)
    if ST=1 & SIX.bit[i]=1 then // SHA-256 Σ1 function
        VR[VT].word[i] ← (src >>> 6) ^ (src >>> 11) ^ (src >>> 25)
end
``` and the sigma functions 1 for a 64-bit dataflow can be implemented as:

```
do i = 0 to 1
    src ← VR[VA].doubleword[i]
    if ST=0b0 & SIX.bit[2×i]=0b0 then // SHA-512 σ0 function
        VR[VT].doubleword[i] ← (src >>> 1) ^ (src >>> 8) ^ (src >> 7)
    if ST=0b0 & SIX.bit[2×i]=0b1 then // SHA-512 σ1 function
        VR[VT].doubleword[i] ← (src >>> 19) ^ (src >>> 61) ^ (src >> 6)
    if ST=0b1 & SIX.bit[2×i]=0b0 then // SHA-512 Σ0 function
        VR[VT].doubleword[i] ← (src >>> 28) ^ (src >>> 34) ^ (src >>> 39)
```

```
if ST=0b1 & SIX.bit[2×i]=0b0 then // SHA-512 Σ1 function
    VR[VT].doubleword[i] ← (src >>> 14) ^ (src >>> 18) ^
    (src >>> 41)
end
```

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A processor comprising:
    an execution unit comprising general-purpose hardware processing components and adapted for performing a processor instruction; and
    an integrated circuit coupled to the execution unit and adapted primarily for calculating an SHA-2 sigma function in a single processor instruction cycle, the sigma function comprising calculating three different rotate and/or shift state operations and combining results of the calculations in an exclusive-or operation.

2. The processor according to claim 1, wherein the execution unit comprises a vector processing unit.

3. The processor according to claim 1, wherein the execution unit supports a 32-bit dataflow, and to calculate a sigma function, the execution unit is adapted to calculate the results for a set of operations of a sigma function and combine the results via an exclusive-or operation.

4. The processor according to claim 3, wherein the execution unit is further adapted to:
    calculate results of each RR2, RR13 and RR22 and combine the results via an exclusive-or operation;
    calculate results of each RR6, RR1, and RR25 and combine the results via an exclusive-or operation;
    calculate results of each RR7, RR18, and SR3 and combine the results via an exclusive-or operation; and
    calculate results of each RR17, RR19 and SR10 and combine the results via an exclusive-or operation.

5. The processor according to claim 4, wherein the execution unit is adapted to perform the calculations and combinations in parallel.

6. The processor according to claim 1, wherein the execution unit supports a 64-bit dataflow, and to calculate a sigma function, the execution unit is adapted to calculate the results of a set of operations for a sigma function and combine the results via an exclusive-or operation.

7. The processor according to claim 6, wherein the execution unit is further adapted to:
    calculate results of each RR28, RR34 and RR39 and combine the results via an exclusive-or operation;
    calculate results of each RR14, RR18 and RR41 and combine the results via an exclusive-or operation;
    calculate results of each RR1, RR8 and SR7 and combine the results via an exclusive-or operation; and
    calculate results of each RR19, RR61 and SR6 and combine the results via an exclusive-or operation.

8. The processor according to claim 7, wherein the execution unit is adapted to perform at least two of the calculations and combinations in parallel.

9. The processor according to claim 7, wherein the execution unit is adapted to perform at least one calculation and combination within a single processor instruction cycle.

10. The processor according to claim 1, wherein the processor is adapted to calculate an SHA-2 hash function by using the integrated circuit for calculating an SHA-2 sigma function.

11. The processor according to claim 1, wherein the processor comprises an out-of-order processor core, and the execution unit is arranged in the out-of-order processor core.

12. A method for calculating an SHA-2 hash function by a processor, the method comprising:
    calculating at least one SHA-2 sigma function in a single processor instruction cycle by using an execution unit adapted for performing a processor instruction, the execution unit comprising an integrated circuit primarily designed for calculating the SHA-2 sigma function, the sigma function comprising calculating three different rotate and/or shift state operations and combining results of the calculations in an exclusive-or operation; and
    calculating the SHA-2 hash function with general-purpose hardware processing components of the processor based on the sigma function.

13. The method according to claim 12, wherein the sigma calculation is performed as a vector operation.

14. The method according to claim 12, wherein for a 32-bit dataflow, the sigma calculation comprises:
    calculating results of a set of operations for a sigma function; and
    combining the results via an exclusive-or operation.

15. The method according to claim 14, wherein the sigma calculation further comprises:
    calculating results of each RR2, RR13 and RR22 and combining the results via an exclusive-or operation;
    calculating results of each RR6, RR1 and RR25 combining the results via an exclusive-or operation;
    calculating results of each RR7, RR18 and SR3 and combining the results via an exclusive-or operation; and
    calculating results of each RR17, RR19 and SR10 and combining the results via an exclusive-or operation.

16. The method according to claim 15, wherein the sigma calculations and combinations occur in parallel within a processor cycle.

17. The method according to claim 12, wherein for a 64-bit dataflow, the sigma calculation comprises:
    calculating results of a set operations for a sigma function; and
    combining the results via an exclusive-or operation.

18. The method according to claim 17, wherein the sigma calculation further comprises:
    calculating results of each RR28, RR34 and RR39 and combining the results via an exclusive-or operation;
    calculating results of each RR14, RR18 and RR41 and combining the results via an exclusive-or operation;
    calculating results of each RR1, RR8 and SR7 and combining the results via an exclusive-or operation; and calculating results of each RR19, RR61 and SR6 and combining the results via an exclusive-or operation.

19. The method according to claim 18, wherein at least two sets of the sigma calculations and combinations occur in parallel within a processor cycle.

20. A processor comprising:
- an execution unit comprising general-purpose hardware processing components and adapted for performing a processor instruction; and
- an integrated circuit coupled to the execution unit and adapted exclusively for calculating an SHA-2 sigma function in a single processor instruction cycle, the sigma function comprising calculating three different rotate and/or shift state operations and combining results of the calculations in an exclusive-or operation.

* * * * *